(12) United States Patent
Masunishi et al.

(10) Patent No.: US 11,630,121 B2
(45) Date of Patent: Apr. 18, 2023

(54) SENSOR AND ELECTRONIC DEVICE

(71) Applicant: KABUSHIKI KAISHA TOSHIBA, Tokyo (JP)

(72) Inventors: Kei Masunishi, Kanagawa (JP); Yasushi Tomizawa, Tokyo (JP); Etsuji Ogawa, Kanagawa (JP); Ryunosuke Gando, Kanagawa (JP); Shiori Kaji, Kanagawa (JP); Hiroki Hiraga, Saitama (JP); Fumito Miyazaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/446,587

(22) Filed: Aug. 31, 2021

(65) Prior Publication Data
US 2022/0137085 A1    May 5, 2022

(30) Foreign Application Priority Data
Nov. 5, 2020 (JP) .............................. JP2020-184891

(51) Int. Cl.
*G01P 15/08* (2006.01)

(52) U.S. Cl.
CPC ...... *G01P 15/08* (2013.01); *G01P 2015/0817* (2013.01)

(58) Field of Classification Search
CPC ............. G01P 15/08; G01P 2015/0817; G01P 15/0802; G01P 15/097; G01K 7/32
See application file for complete search history.

(56) References Cited

U.S. PATENT DOCUMENTS

| | | | | |
|---|---|---|---|---|
| 2009/0255339 | A1* | 10/2009 | McNeil | G01P 15/097 29/596 |
| 2014/0208823 | A1* | 7/2014 | Trusov | G01P 15/125 73/1.38 |

(Continued)

FOREIGN PATENT DOCUMENTS

JP    H4-115165 A    4/1992

OTHER PUBLICATIONS

Dongsuk D. Shin et al., "Environmentally Robust Differential Resonant Accelerometer in a Wafer-Scale Encapsulation Process," IEEE MEMS 2017, pp. 17-20 (2017).

*Primary Examiner* — Natalie Huls
*Assistant Examiner* — Cynthia L Davis
(74) *Attorney, Agent, or Firm* — Finnegan, Henderson, Farabow, Garrett & Dunner, LLP

(57) ABSTRACT

According to one embodiment, a sensor includes a first detection element, and a processing part. The first detection element includes a base body, a first supporter fixed to the base body, a first movable part, first and second counter conductive parts. The first movable part is supported by the first supporter and separated from the base body. The first movable part includes a first movable base part supported by the first supporter, a second movable base part connected with the first movable base part, a first movable beam including a first beam, and a second movable beam including a second beam. The first beam includes a first end portion and a first other end portion. The second beam includes a second end portion and a second other end portion. The first counter conductive part faces the first movable beam. The second counter conductive part faces the second movable beam.

20 Claims, 13 Drawing Sheets

(56) References Cited

U.S. PATENT DOCUMENTS

2015/0226762 A1* 8/2015 Seshia .................... G01K 11/26
 73/495
2021/0140992 A1* 5/2021 Reinke .................. G01P 15/097

* cited by examiner

SENSOR AND ELECTRONIC DEVICE

CROSS-REFERENCE TO RELATED APPLICATIONS

This application is based upon and claims the benefit of priority from Japanese Patent Application No. 2020-184891, filed on Nov. 5, 2020; the entire contents of which are incorporated herein by reference.

FIELD

Embodiments described herein relate generally to a sensor and an electronic device.

BACKGROUND

For example, there is a sensor that utilizes a MEMS structure. It is desirable to increase the detection accuracy of the sensor.

DETAILED DESCRIPTION

Figure 1A:
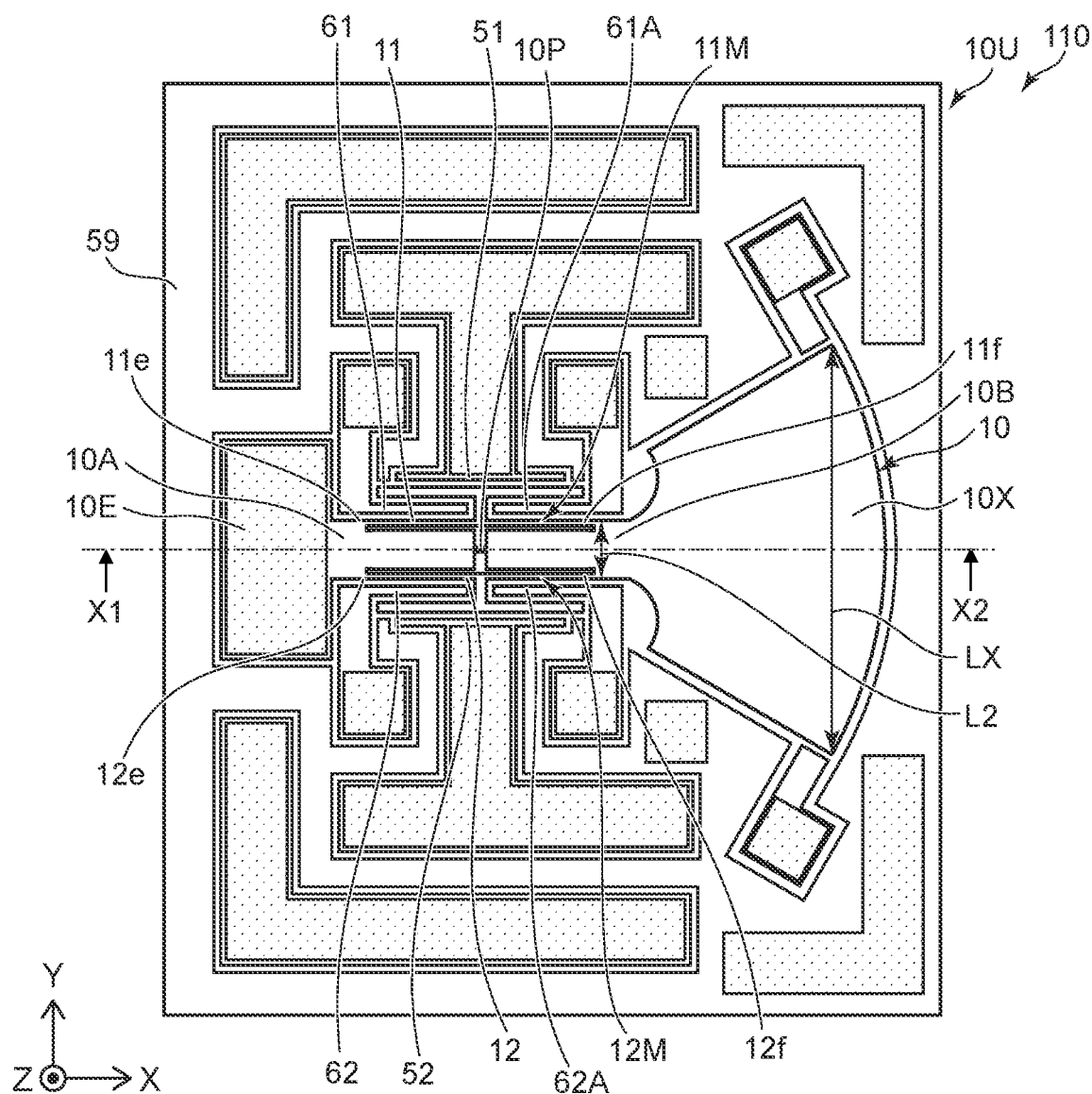
FIGS. 1A and 1B are schematic views illustrating a sensor according to a first embodiment.

According to one embodiment, a sensor includes a first detection element, and a processing part. The first detection element includes a base body, a first supporter fixed to the base body, a first movable part, a first counter conductive part, and a second counter conductive part. The first movable part is supported by the first supporter and separated from the base body. The first movable part includes a first movable base part supported by the first supporter, a second movable base part connected with the first movable base part, a first movable beam including a first beam, and a second movable beam including a second beam. The first beam includes a first end portion and a first other end portion. The first end portion is connected with the first movable base part. The first other end portion is connected with the second movable base part. The second beam includes a second end portion and a second other end portion. The second end portion is connected with the first movable base part. The second other end portion is connected with the second movable base part. The first counter conductive part faces the first movable beam. The second counter conductive part faces the second movable beam. The processing part is configured to perform a first operation. The first operation outputs information regarding an acceleration applied to the first detection element and a temperature of the first detection element based on a first signal obtained from the first counter conductive part and a second signal obtained from the second counter conductive part.

According to one embodiment, an electronic device includes the sensor described above, and a circuit processing part configured to control a circuit based on a signal obtained from the sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIGS. 1A, 1B, FIG. 2, FIGS. 3A to 3C are schematic views illustrating a sensor according to a first embodiment.

Figure 1B:
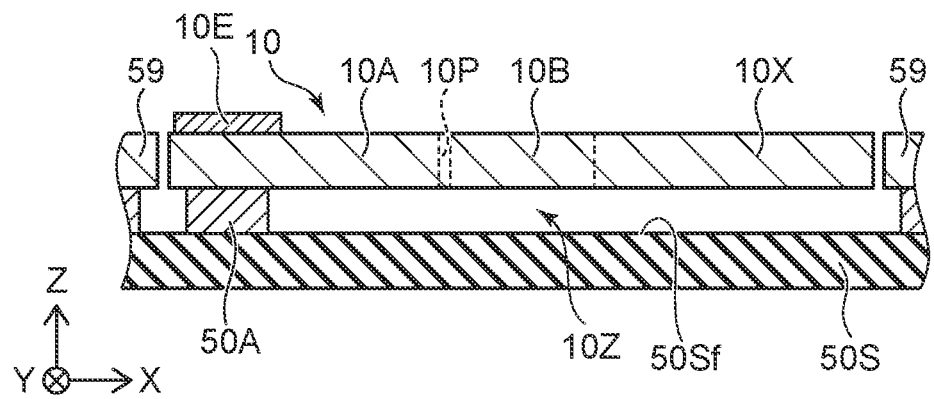
Figure 2:
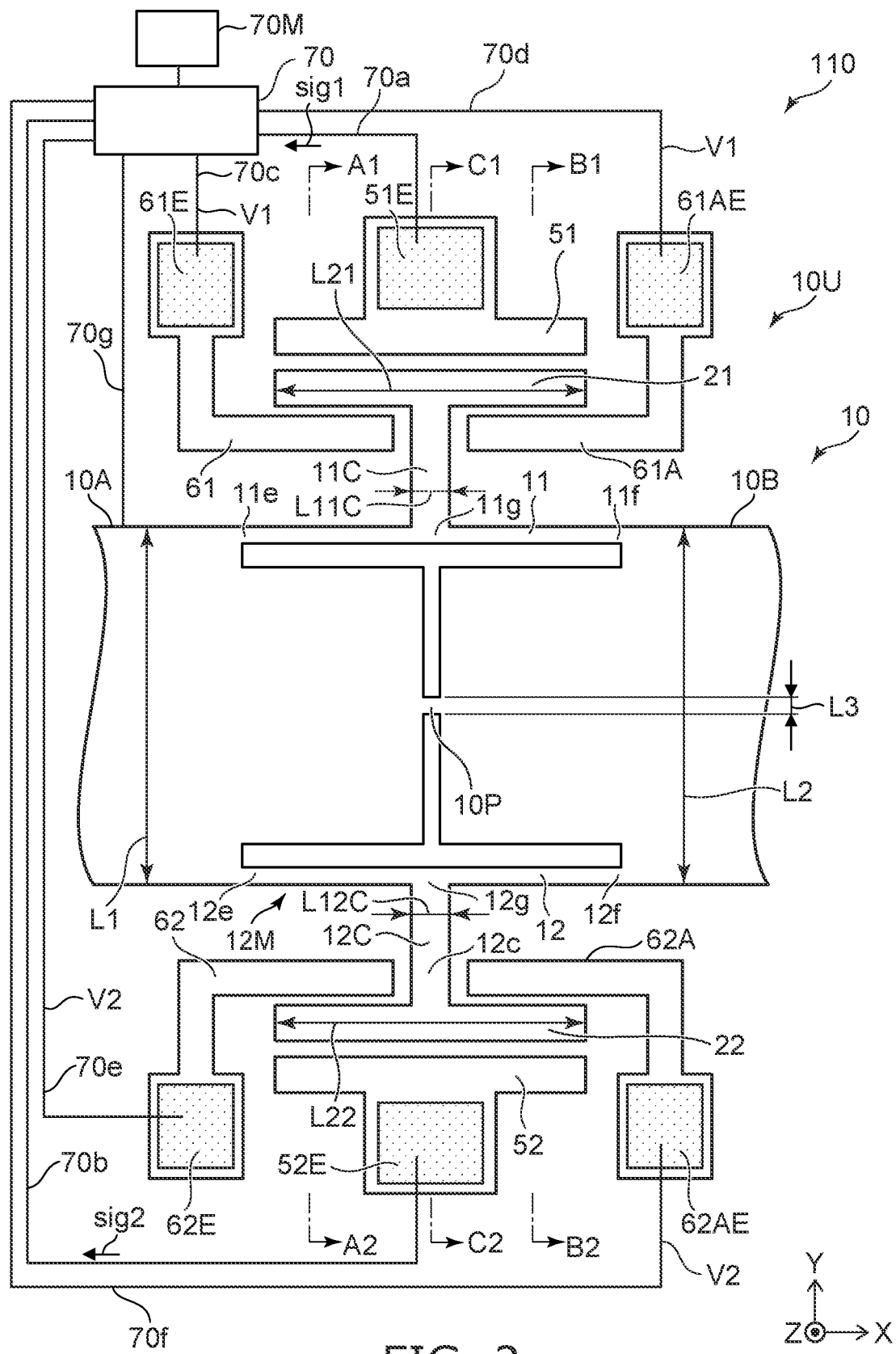
FIG. 2 is a schematic view illustrating the sensor according to the first embodiment.
Figure 3A:
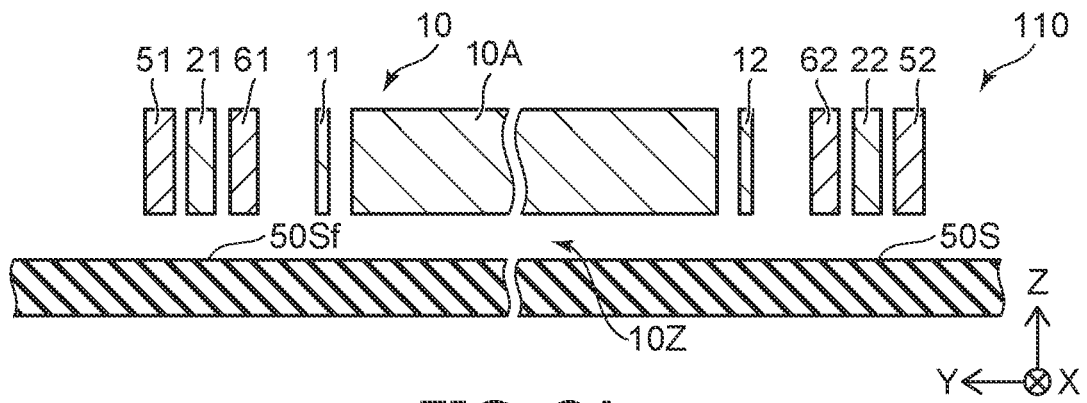
FIGS. 3A to 3C are schematic views illustrating the sensor according to the first embodiment.
Figure 3B:
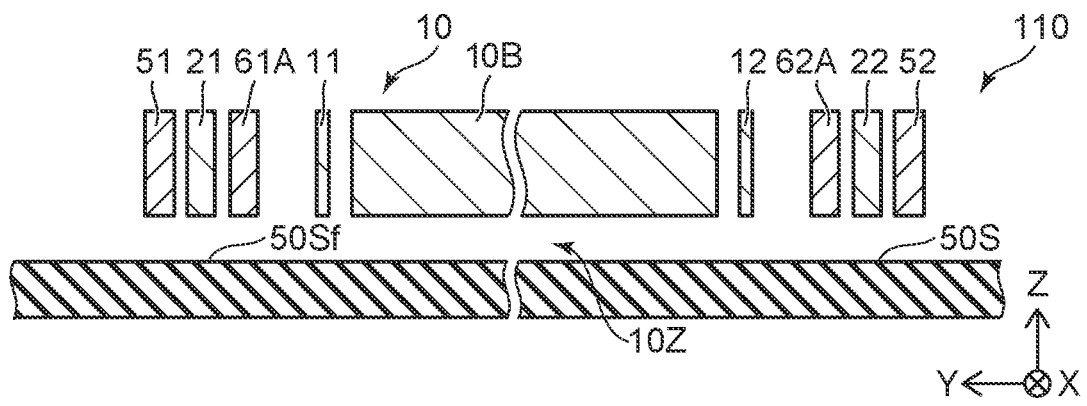
Figure 3C:
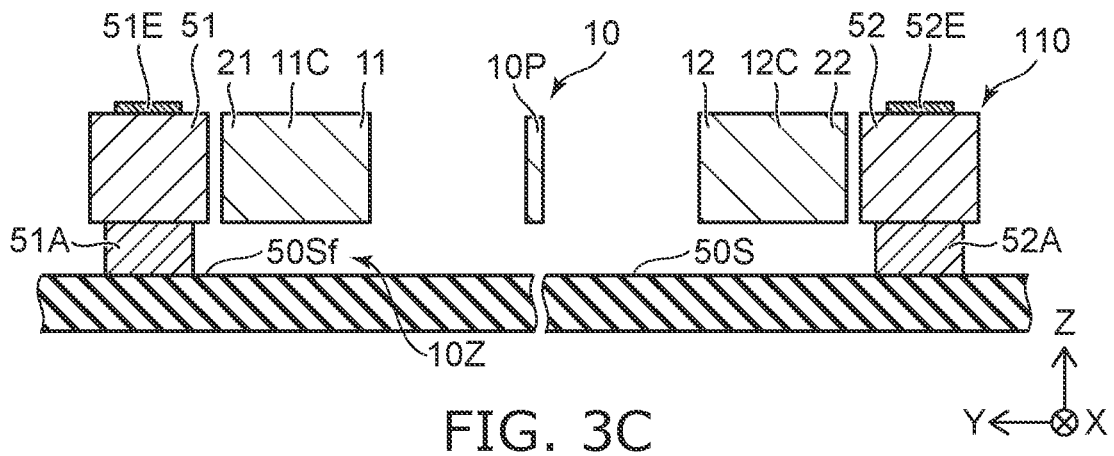

FIG. 1A is a plan view. FIG. 1B is a line X1-X2 cross-sectional view of FIG. 1A. FIG. 2 is a plan view enlarging a portion of FIG. 1A. FIG. 3A is a line A1-A2 cross-sectional view of FIG. 2. FIG. 3B is a line B1-B2 cross-sectional view of FIG. 2. FIG. 3C is a line C1-C2 cross-sectional view of FIG. 2.

As shown in FIG. 2, the sensor 110 according to the first embodiment includes a first detection element 10U and a processing part 70.

As shown in FIGS. 1A and 1B, the first detection element 10U includes a base body 50S, a first supporter 50A, a first movable part 10, a first counter conductive part 51, and a second counter conductive part 52. The first supporter 50A is fixed to the base body 50S.

As shown in FIG. 1B, the first movable part 10 is supported by the first supporter 50A. The first movable part 10 is separated from the base body 50S. For example, a gap 10Z is provided between the base body 50S and the first movable part 10. For example, the base body 50S includes a first surface 50Sf. The gap 10Z is between the first surface 50Sf and the first movable part 10.

A first direction from the substrate 50S toward the first movable part 10 is taken as a Z-axis direction. The Z-axis direction is substantially perpendicular to the first surface 50Sf. One direction perpendicular to the Z-axis direction is taken as an X-axis direction. A direction perpendicular to the Z-axis direction and the X-axis direction is taken as a Y-axis direction.

The first movable part 10 includes a first movable base part 10A, a second movable base part 10B, a first movable beam 11M, and a second movable beam 12M. The first movable base part 10A is supported by the first supporter 50A. The second movable base part 10B is connected with the first movable base part 10A. As described later, in the example, the second movable base part 10B is connected with the first movable base part 10A by a connection base part 10P.

As shown in FIGS. 1A and 2, the first movable beam 11M includes the first beam 11. The second movable beam 12M includes a second beam 12. The first beam 11 includes a first end portion 11e and a first other end portion 11f. The first end portion 11e is connected with the first movable base part 10A. The first other end portion 11f is connected with the second movable base part 10B. The second beam 12 includes a second end portion 12e and a second other end portion 12f. The second end portion 12e is connected with the first movable base part 10A. The second other end portion 12f is connected with the second movable base part 10B.

The first counter conductive part 51 faces the first movable beam 11M. The second counter conductive part 52 faces the second movable beam 12M.

As shown in FIG. 1A, a peripheral portion 59 may be provided. In an X-Y plane, the peripheral portion is provided around the first supporter 50A, the first movable part 10, the first counter conductive part 51, and the second counter conductive part 52.

The first movable part 10 is conductive. The base body 50S includes, for example, silicon or the like. The base body 50S may be insulating. For example, the first supporter 50A may include an insulating member.

As shown in FIGS. 1A and 1B, an electrode 10E may be provided. The electrode 10E is electrically connected with the first movable part 10.

The processing part 70 (see FIG. 2) can perform the first operation. In the first operation, the processing part 70 outputs information on acceleration applied to the first detection element 10U and information on the temperature of the first detection element 10U based on the first signal sag1 obtained from the first counter conductive part 51 and the second signal sig2 obtained from the second counter conductive part 52. As will be described later, the first operation may include outputting a temperature-compensated acceleration. According to the embodiment, it is possible to provide a sensor which can improve the detection accuracy. An example of the first operation will be described later.

As shown in FIG. 3C, the first counter conductive part 51 is fixed to the base body 50S via the first counter supporter 51A. The second counter conductive part 52 is fixed to the base body 50S via the second counter supporter 52A. For example, the first counter supporter 51A and the second counter supporter 52A may include an insulating member. The first counter conductive part 51 and the second counter conductive part 52 are electrically insulated from the base body 50S.

The first signal sig1 corresponds to a first electrical signal generated between the first movable part 10 and the first counter conductive part 51. The second signal sig2 corresponds to a second electrical signal generated between the first movable part 10 and the second counter conductive part 52.

The first direction (Z-axis direction, see FIG. 1B) from the base body 50S toward the first movable part 10 crosses a second direction (see FIG. 2) from the first end portion 11e of the first beam 11 toward the first other end portion 11f. The second direction is, for example, the X-axis direction. A direction from the second end portion 12e toward the second other end portion 12f is along the second direction (for example, the X-axis direction).

As shown in FIG. 2, the first movable part 10 includes a connection base part 10P. The connection base part 10P is provided between the first movable base part 10A and the second movable base part 10B. The connection base part 10P connects the first movable base part 10A and the second movable base part 10B to each other.

As shown in FIG. 2, a length of the first movable base part 10A along a third direction is taken as a first length L1. The third direction crosses the plane including the first and second directions. The third direction is, for example, the Y-axis direction. A length of the second movable base part 10B along the third direction is taken as a second length L2. A length of the connection base part 10P along the third direction is taken as a third length L3. The third length L3 is shorter than the first length L1 and shorter than the second length L2. The connection base part 10P is between the first beam 11 and the second beam 12 in the third direction (for example, the Y-axis direction). The connection base part 10P is between the first movable beam 11M and the second movable beam 12M in the third direction. The connection base part 10P is, for example, a pivot portion or a hinge portion.

By providing the connection base part 10P, the second movable base part 10B becomes easy to move. For example, the second movable base part 10B is likely to be displaced in a direction including the Y-axis direction according to the acceleration. As a result, stress is likely to be applied to the first beam 11 and the second beam 12. For example, one of compressive stress and tensile stress is applied to the first beam 11. For example, the other of compressive stress and tensile stress is applied to the second beam 12.

For example, a resonance frequency of the beam changes according to the stress. The direction of increase or decrease of the resonance frequency of the beam changes according to the polarity of the stress. By providing the connection base part 10P, the change in the resonance frequency of the two beams can be increased. More accurate detection becomes possible.

As shown in FIG. 1A, the first movable part 10 further includes a movable member 10X. In the second direction (for example, the X-axis direction), the second movable base part 10B is between the connection base part 10P and the movable member 10X. The movable member 10X is connected with the second movable base part 10B. A length of the movable member 10X along the third direction (for example, the Y-axis direction) is taken as a length LX. The length LX is longer than a length of the second movable base portion 10B along the third direction (second length L2). The movable member 10X is displaced by acceleration. The movable member 10X is, for example, a movable mass. By providing the movable member 10X, higher sensitivity can be obtained. By connecting the second movable base part 10B with the movable member 10X, the second movable base part 10B becomes easy to move.

As shown in FIG. 2, in this example, the first movable beam 11M includes a first movable conductive part 21 and a first connection region 11C. The first beam 11 includes a first intermediate region 11g between the first end portion 11e and the first other end portion 11f. The first connection region 11C connects the first intermediate region 11g and the first movable conductive part 21. A length L21 of the first movable conductive part 21 along the second direction (for example, the X-axis direction) is longer than a length L11C of the first connection region 11C along the second direction. The first movable conductive part 21 extends, for example, along the X-axis direction.

As shown in FIG. 2, the second movable beam 12M includes a second movable conductive part 22 and a second connection region 12C. The second beam 12 includes a second intermediate region 12g between the second end portion 12e and the second other end portion 12f, and the second connection region 12C connects the second intermediate region 12g and the second movable conductive part 22. A length L22 of the second movable conductive part 22 along the second direction (for example, the X-axis direction) is longer than a length L12C along the second direction of the second connection region 12C. The second movable conductive part 22 extends along the X-axis direction, for example.

By providing the first movable conductive part 21, an area where the first movable beam 11M and the first counter conductive part 51 face each other can be increased. For example, even when the first beam 11 vibrates and the first beam 11 bends in the Y-axis direction, the first movable conductive part 21 can be displaced along the Y-axis direction while maintaining a parallel state to the first counter conductive part 51. For example, it is easy to obtain high capacitance sensitivity.

By providing the second movable conductive part 22, an area where the second movable beam 12M and the second counter conductive part 52 face each other can be increased. For example, even when the second beam 12 vibrates and the second beam 12 bends in the Y-axis direction, the second movable conductive part 22 can be displaced along the Y-axis direction while maintaining a parallel state to the second counter conductive part 52. For example, it is easy to obtain high capacitance sensitivity.

As shown in FIG. 2, in this example, the first detection element 10U includes a first drive conductive part 61 and a second drive conductive part 62. The first drive conductive part 61 faces the first movable beam 11M. The second drive conductive part 62 faces the second movable beam 12M. The processing part 70 can apply a voltage (first voltage V1) to the first drive conductive part 61. The processing part 70 can apply a voltage (second voltage V2) to the second drive conductive part 62. These voltages are, for example, drive/adjustment voltages.

In the example shown in FIG. 2, in addition to the first drive conductive part 61, another first drive conductive part 61A is provided. The other first drive conductive part 61A faces the first movable beam 11M. In addition to the second drive conductive part 62, another second drive conductive part 62A is provided. The other second drive conductive part 62A faces the second movable beam 12M. The processing part 70 can apply a voltage (first voltage V1) to the other first drive conductive part 61A. The processing part 70 can apply a voltage (second voltage V2) to the other second drive conductive part 62A.

As shown in FIG. 2, the processing part 70 is electrically connected with the first counter conductive part 51 via an electrode 51E by a wiring 70a. The processing part 70 is electrically connected with the second counter conductive part 52 via an electrode 52E by a wiring 70b. The processing part 70 is electrically connected with the first drive conductive part 61 via an electrode 61E by a wiring 70c. The processing part 70 is electrically connected with the other first drive conductive part 61A via an electrode 61AE by a wiring 70d. The processing part 70 is electrically connected with the second drive conductive part 62 via an electrode 62E by a wiring 70e. The processing part 70 is electrically connected with the other second drive conductive part 62A via an electrode 62AE by a wiring 70f. The processing part 70 is electrically connected with the first movable part 10.

For example, the processing part 70 is electrically connected with the first movable part 10 via an electrode 10E (see FIG. 1B) by a wiring 70g (see FIG. 2).

In the following, an example of operation in the sensor 110 according to the embodiment will be described. As described above, the processing part 70 can perform the first operation. The first operation includes deriving information on acceleration and temperature based on a difference and a sum of a first resonance frequency of the first movable beam 11M and a second resonance frequency of the second movable beam 12M. The first resonance frequency is obtained from the first signal sig1 (see FIG. 2). The second resonance frequency is obtained from the second signal sig2.

For example, the resonance frequency can be obtained by processing a signal with a PLL (phase locked loop) circuit. For example, the PLL circuit may be included in the processing part 70. The PLL circuit may be provided separately from the processing part 70.

For example, the first operation may include deriving information about acceleration and temperature based on data about the relationship between the first resonance frequency and the second resonance frequency and the multiple accelerations and the multiple temperatures. This data is stored in, for example, a storage part 70M (see FIG. 2). The processing part 70 acquires data from the storage part 70M that stores the data. For example, the first operation may include deriving information about acceleration and temperature based on the acquired data. The sensor 110 according to the embodiment may further include the storage part 70M.

For example, the acceleration applied to the first detection element 10U and the temperature of the first detection element 10U are functions of the first resonance frequency and the second resonance frequency.

In one example, the acceleration G ($f_1$, $f_2$) and the temperature T ($f_1$, $f_2$) are represented by the following first and second equations.

$$G(f_1,f_2)=a_1f_1+b_1f_2+c_1 \quad (1)$$

$$T(f_1,f_2)=a_2f_1+b_2f_2+c_2 \quad (2)$$

"G" is the acceleration. "T" is the temperature. "$f_1$" is the first resonance frequency, "$f_2$" is the second resonance frequency. "$a_1$", "$b_1$", "$c_1$", "$a_2$", "$b_2$", and "$c_2$" are coefficients. The data stored in the storage part 70M includes at least one of values of "$a_1$", "$b_1$", "$c_1$", "$a_2$", "$b_2$", or "$c_2$". The data stored in the storage part 70M includes the information (for example, a function) of the above equation. These data are obtained, for example, by measurements made in advance. The acceleration G and the temperature T are controlled in the measurement performed in advance.

The acceleration G ($f_1$, $f_2$) and the temperature T ($f_1$, $f_2$) may be expressed by the following third and fourth equations.

$$G(f_1,f_2)=a_{11}f_1+a_{12}f_1^2+b_{11}f_2+b_{12}f_2^2+c_{11} \quad (3)$$

$$T(f_1,f_2)=a_{21}f_1+a_{22}f_1^2+b_{21}f_2+b_{22}f_2^2+c_{21} \quad (4)$$

In the third and fourth equations, "$a_{11}$", "$a_{12}$", "$b_{11}$", "$b_{12}$", "$c_{11}$", "$a_{21}$", "$a_{22}$", "$b_{21}$", "$b_{22}$", and "$c_{21}$" are coefficients.

The function of the first resonance frequency $f_1$ and the second resonance frequency $f_2$ may include a function of the third order or higher of the first resonance frequency $f_1$ and the second resonance frequency $f_2$. The function of the first resonance frequency $f_1$ and the second resonance frequency $f_2$ may include the interaction term of the first resonance frequency $f_1$ and the second resonance frequency $f_2$.

The acceleration "G" and the temperature "T" can be calculated (for example, estimated) from the first resonance frequency $f_1$ and the second resonance frequency $f_2$. The calculation of the coefficients may be performed by, for example, the least squares method. For example, based on the above equations or the like, the information on the acceleration and the temperature can be derived based on the difference and sum of the first resonance frequency $f_1$ and the second resonance frequency $f_2$. For example, with respect to the acceleration "G", the first resonance frequency $f_1$ and the second resonance frequency $f_2$ change in opposite directions (opposite polarities). For example, with respect to the temperature "T", the first resonance frequency $f_1$ and the second resonance frequency $f_2$ change in the same direction (same polarity) as each other.

Figure 4:
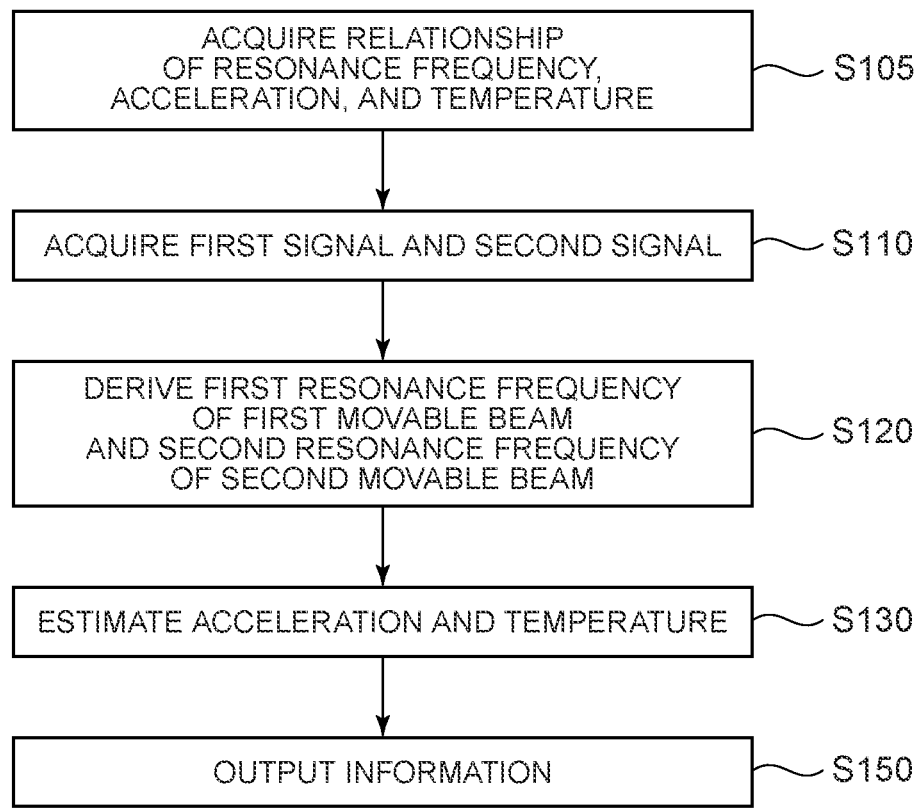
FIG. 4 is a flow chart illustrating the operation of the sensor according to the first embodiment.

FIG. 4 is a flowchart illustrating the operation of the sensor according to the first embodiment. At least a part of the operation shown in FIG. 4 is performed by the processing part 70.

As shown in FIG. 4, data regarding the relationship between the resonance frequency (first resonance frequency $f_1$ and the second resonance frequency $f_2$), the acceleration G, and the temperature T is acquired (step S105). As described above, this data is acquired in advance. For example, the processing part 70 may acquire the data stored in the storage part 70M.

As shown in FIG. 4, the processing part 70 acquires the first signal sig1 obtained from the first counter conductive part 51 and the second signal sig2 obtained from the second counter conductive part 52 (step S110).

The processing part 70 derives the first resonance frequency $f_1$ of the first movable beam 11M based on the first signal sig1, and calculates the second resonance frequency $f_2$ of the second movable beam 12M based on the second signal sig2. (Step S120). As described above, the processing is performed by the PLL circuit or the like.

The processing part 70 estimates the acceleration G and the temperature T based on the first resonance frequency $f_1$ and the second resonance frequency $f_2$ (step S130). For example, the above equations 1 and 2 are used. For example, the above-mentioned third and fourth equations may be used.

The processing part 70 outputs the information regarding the estimated acceleration G and temperature T (step S150).

In this way, in the embodiment, the acceleration G and the temperature T can be output. In the embodiment, the first beam 11 and the second beam 12 are provided. In these beams, the resonance frequency changes according to the acceleration G and the temperature T. Highly accurate detection is possible by using the relational expressions of the above-mentioned first and second resonance frequencies and the acceleration and the temperature.

Figure 5:
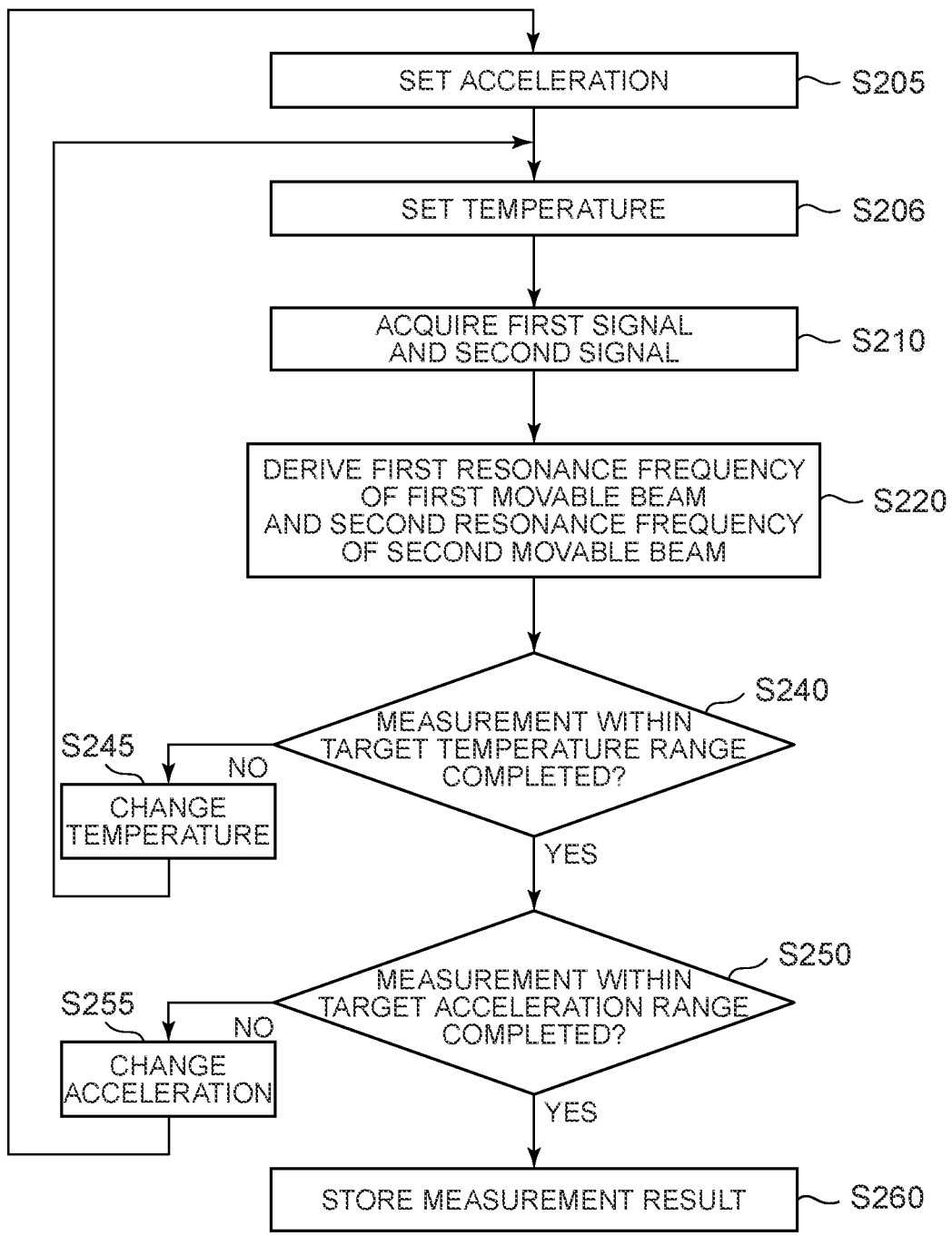
FIG. 5 is a flow chart illustrating the operation of the sensor according to the first embodiment.

FIG. 5 is a flowchart illustrating the operation of the sensor according to the first embodiment. At least a part of the operation shown in FIG. 5 may be performed by the processing part 70. The operation shown in FIG. 5 may be performed by another processing part, and the obtained data may be stored in the storage part 70M or the like.

As shown in FIG. 5, the acceleration G is set (step S205). For example, m the first operation, the acceleration G is set to 0.

The temperature T is set (step S206). For example, the temperature of the first detection element 10U is set to one of several temperatures within the target temperature range. The target temperature range is, for example, the operating temperature range of the sensor. The target temperature range is, for example, not lower than −20° C. and not lower than 80° C.

The first signal sig1 obtained from the first counter conductive part 51 and the second signal sig2 obtained from the second counter conductive part 52 are acquired (step S210).

The first resonance frequency $f_1$ of the first movable beam 11M is calculated based on the first signal sig1, and the second resonance frequency $f_2$ of the second movable beam 12M is calculated based on the second signal sig2 (step S220). As described above, the processing is performed by the PLL circuit or the like.

It is determined whether or not the measurement within the target temperature range is completed (step S240). When the measurement within the target temperature range is not completed, the process proceeds to step S245. In step S245, the temperature of the first detection element 10U is changed, and the process returns to step S210.

When the measurement within the target temperature range is completed, the process proceeds to step S250. In step S250, it is determined whether or not the measurement within the target acceleration range is completed. When the measurement within the target acceleration range is not completed, the process proceeds to step S255. The acceleration is changed in step S255. Then, the process returns to step S205.

When the measurement within the target acceleration range is completed, the measurement result is stored (step S260).

For example, the operation of FIG. 5 may be performed under nine kinds of conditions with three kinds of acceleration G of −1 G, 0 G, and +1 G and three kinds of temperature T of −20° C., +20° C., and +80° C. For example, the coefficients of the relational expression of the above-mentioned first and second resonance frequencies and the acceleration and the temperature can be obtained by the least squares method or the like.

By such an operation, for example, data regarding the relationship of the first resonance frequency $f_1$, the second resonance frequency $f_2$, the acceleration G, and the temperature T is acquired and stored. Using the acquired and stored data, the operation described with respect to FIG. 4 is performed.

As already described with respect to FIG. 2, in this example, the first detection element 10U includes the first drive conductive part 61 and the second drive conductive part 62.

The first resonance frequency $f_1$ of the first movable beam 11M changes depending on the first voltage V1 applied to the first drive conductive part 61. The change in the first resonance frequency $f_1$ is based on, for example, the soft spring effect due to the electrostatic spring and the hard spring effect due to the geometric non-linearity in the large deformation. The second resonance frequency $f_2$ of the second movable beam 12M changes depending on the second voltage V2 applied to the second drive conductive part 62. The change in the second resonance frequency $f_2$ is based on, for example, the soft spring effect due to the electrostatic spring and the hard spring effect due to the geometric non-linearity in the large deformation. In the embodiment, the acceleration and the temperature may be detected by controlling the difference between the first resonance frequency $f_1$ and the second resonance frequency $f_2$ when these voltages are applied.

In the example shown in FIG. 2, in addition to the first drive conductive part 61, the other first drive conductive part 61A is provided. In addition to the second drive conductive part 62, the other second drive conductive part 62A is provided. The processing part 70 can apply the voltage (first voltage V1) the other first drive conductive part 61A. The processing part 70 can apply the voltage (second voltage V2) to the other second drive conductive part 62A.

Figure 6:
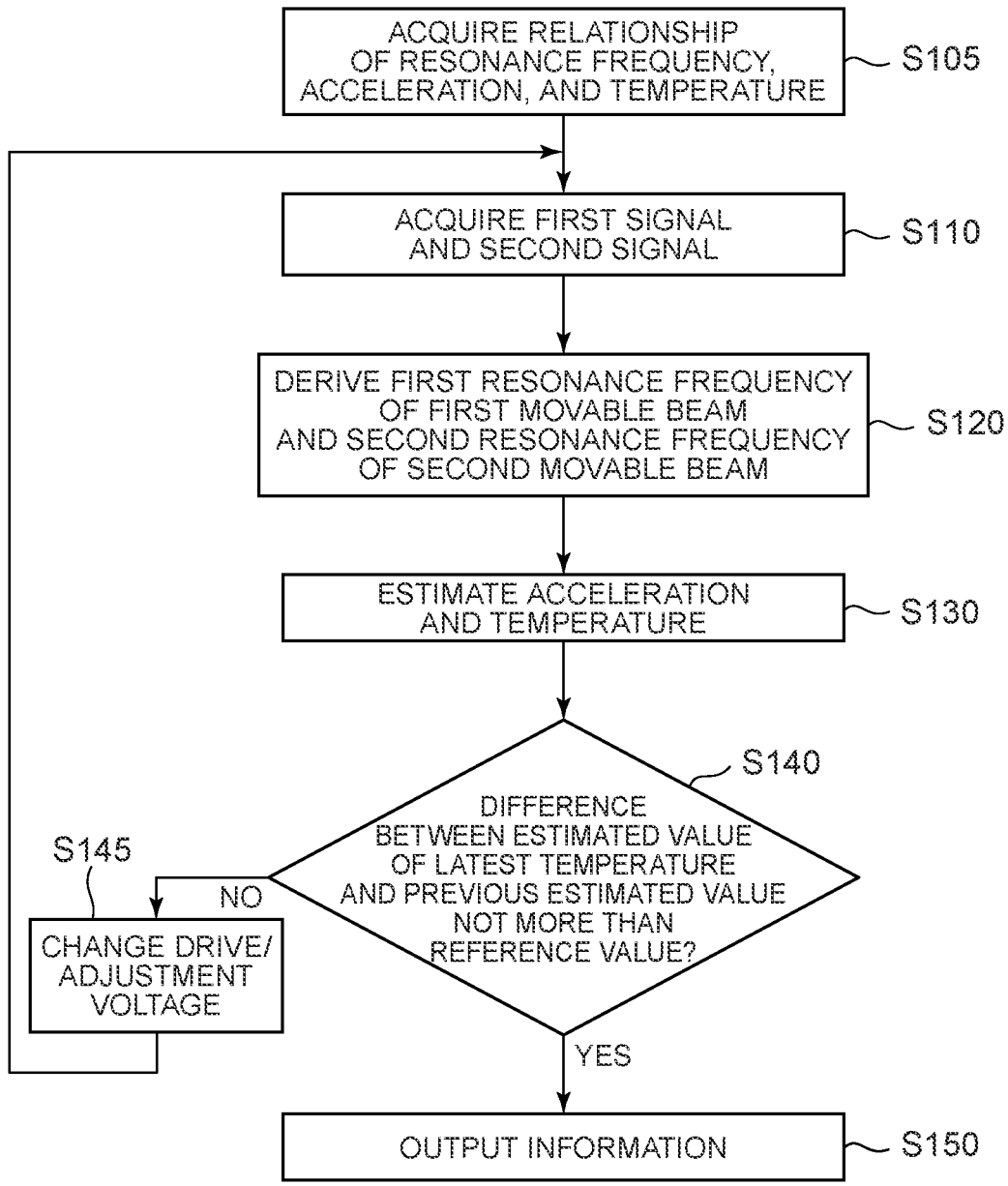
FIG. 6 is a flow chart illustrating the operation of the sensor according to the first embodiment.

FIG. 6 is a flowchart illustrating the operation of the sensor according to the first embodiment. At least a part of the operation shown in FIG. 6 is performed by the processing pat 70.

As shown in FIG. 6, data regarding the relationship of the resonance frequency (first resonance frequency $f_1$ and the second resonance frequency $f_2$), the acceleration G, and the temperature T is acquired (step S105). As described above, this data is acquired in advance. For example, the processing part 70 may acquire the data stored in the storage part 70M.

As shown in FIG. 6, the processing part 70 acquires the first signal sig1 obtained from the first counter conductive part 51 and the second signal sig2 obtained from the second counter conductive part 52 (step S110).

The processing part 70 derives the first resonance frequency $f_1$ of the first movable beam 11M based on the first signal sig1, and calculates the second resonance frequency $f_2$ of the second movable beam 12M based on the second signal sig2. (Step S120). As described above, the processing is performed by the PLL circuit or the like.

The processing part 70 estimates the acceleration G and the temperature T based on the first resonance frequency $f_1$ and the second resonance frequency $f_2$ (step S130). For example, the above equations 1 and 2 are used. The above-mentioned third and fourth equations may be used.

In a case where the difference between the estimated temperature estimated in the latest step S130 and the estimated temperature estimated in the previous step S130 is more than the reference value, the processing part 70 performs the processing of step S145.

In step S145, the processing part 70 changes to the drive/adjustment voltage (first voltage V1 and second voltage V2 described above) according to the latest estimated value of the temperature. After that, the process returns to step S110. Steps S110 to S145 are repeated until the difference between the latest estimated value of the temperature and the previous estimated value of the temperature is equal to or less than the reference value.

In step S140, in a case where the difference between the latest estimated value of the temperature and the previous estimated value of the temperature is not more than the reference value, the processing part 70 outputs information regarding the acceleration G and the temperature T (step S150).

In this way, in the embodiment, the acceleration G and the temperature T can be output. In the embodiment, the first beam 11 and the second beam 12 are provided. In these beams, the resonance frequency changes according to the acceleration G and the temperature T. Highly accurate detection is possible by using the relational expressions of the above-mentioned first and second resonance frequencies, the acceleration and the temperature. Further, by applying the drive/adjustment voltage corresponding to the temperature T, for example, it is possible to output an acceleration G in which the dependence of the temperature T is corrected.

As described above, the first operation may include that at least one of the first voltage V1 or the second voltage V2 (that is, the drive/adjustment voltage) is changed, and the temperature dependence of the difference between the first resonance frequency $f_1$ and the second resonance frequency $f_2$ is reduced. For example, the drive/adjustment voltage such that the temperature dependence of the difference between the first resonance frequency $f_1$ and the second resonance frequency $f_2$ becomes substantially 0 may be applied to the first drive conductive part 61 (and the other first drive conductive part 61A and the second drive conductive part 62 (and the other second drive conductive part 62A). Data regarding the relationship between the drive/adjustment voltage and the temperature T in this state may be acquired in advance. The data acquired in advance is stored in, for example, the storage part 70M.

As described above, in the first operation, the processing part 70 is possible to output the acceleration G and the temperature T when the difference between the latest estimated value of the temperature and the previous estimated value of the temperature becomes smaller than the reference value as the acceleration G applied to the first detection element 10U and the temperature T of the first detection element 10U.

The drive/adjustment voltage (first voltage V1 and second voltage V2) may include an AC component and a DC component. The first movable beam 11M and the second movable beam 12M vibrate based on the AC component. The vibration is adjusted based on the AC component and the DC component. The adjustment of vibration is based on, for example, the soft spring effect due to the electrostatic spring and the hard spring effect due to the geometric non-linearity in large deformation.

For example, in a case where the first detection element 10U includes the first drive conductive part 61 and the first drive conductive part 62, the first operation includes applying the first voltage V1 including the AC component to the first drive conductive part 61 to vibrate the first movable beam 11M, and applying the second voltage V2 including the AC component to the second drive conductive part 62 to vibrate the second movable beam 12M. As described above, the first drive conductive part 61 faces the first movable beam 11M. The second drive conductive part 62 faces the second movable beam 12M. The DC component of the first voltage V1 may be different from the DC component of the second voltage V2. For example, the voltage may be adjusted so that the temperature dependence of the difference between the first resonance frequency $f_1$ and the second resonance frequency $f_2$ becomes substantially zero.

As will be described later, the conductive part to which the driving voltage is applied and the conductive part to which the adjusting voltage is applied may be provided separately.

In the following, an example of acquiring data regarding the relationship of the first resonance frequency $f_1$, the second resonance frequency $f_2$, the acceleration G, and the temperature T will be described.

Figure 7:
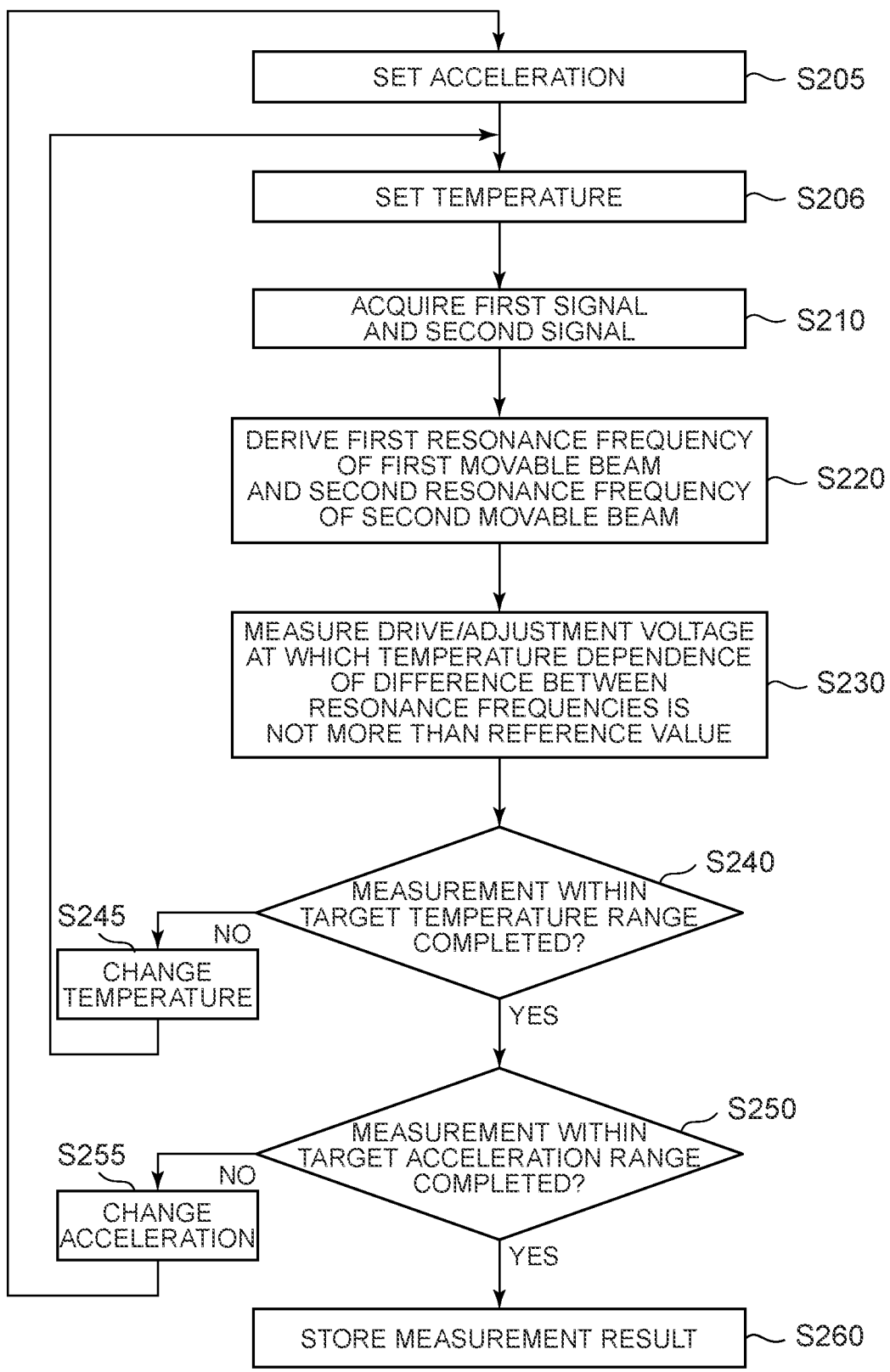
FIG. 7 is a flow chart illustrating the operation of the sensor according to the first embodiment.

FIG. 7 is a flowchart illustrating the operation of the sensor according to the first embodiment. At least a part of the operation shown in FIG. 7 may be performed by the processing part 70. The operation shown in FIG. 7 may be performed by another processing part, and the obtained data may be stored in the storage part 70M or the like.

As shown in FIG. 7, the acceleration G is set (step S205). For example, in the first operation, the acceleration G is set to 0.

The temperature T is set (step S206). For example, the temperature of the first detection element 10U is set to one of several temperatures within the target temperature range. The target temperature range is, for example, the operating temperature range of the sensor. The target temperature range is, for example, not lower than −20° C. and not higher than 80° C.

The first signal sig1 obtained from the first counter conductive part 51 and the second signal sig2 obtained from the second counter conductive part 52 are acquired (step S210).

The first resonance frequency $f_1$ of the first movable beam 11M is calculated based on the first signal sig1, and the second resonance frequency $f_2$ of the second movable beam 12M is calculated based on the second signal sig2 (step S220). As described above, the processing is performed by the PLL circuit or the like.

The relationship of the drive/adjustment voltage at which the temperature dependence of the difference between the first resonance frequency $f_1$ and the second resonance frequency $f_2$ is not more than the reference value, and the acceleration and the temperature is measured (step S230).

It is determined whether or not the measurement within the target temperature range is completed (step S240). When the measurement within the target temperature range is not completed, the process proceeds to step S245. In step S245, the temperature of the first detection element 10U is changed, and the process returns to step S210.

When the measurement within the target temperature range is completed, the process proceeds to step S250. In step S250, it is determined whether or not the measurement within the target acceleration range is completed. When the measurement within the target acceleration range is not completed, the process proceeds to step S255. The acceleration is changed in step S255. Then, the process returns to step S205.

When the measurement within the target acceleration range is completed, the measurement result is stored (step S260).

For example, the operation shown in FIG. 7 may be performed under nine conditions with three types of acceleration G of −1 G, 0 G, and +1 G, and three types of temperature T of −20° C., +20° C., and +80° C. For example, the above coefficient can be obtained by the least squares method or the like. For example, the relationship of the drive/adjustment voltage at which the temperature dependence of the difference between the first resonance frequency $f_1$ and the second resonance frequency $f_2$ is not more than the reference value, and the acceleration and the temperature is required. For example, the coefficient of the relational expression between the above-mentioned first resonance frequency $f_1$ and the second resonance frequency $f_2$, and the acceleration and temperature can be obtained by the least squares method or the like.

By such an operation, for example, data regarding the relationship of the first resonance frequency $f_1$, the second resonance frequency $f_2$, the acceleration G, the temperature T, and the drive/adjustment voltage is acquired and stored. Using the acquired and stored data, the operation described with respect to FIG. 6 is performed.

Figure 8:
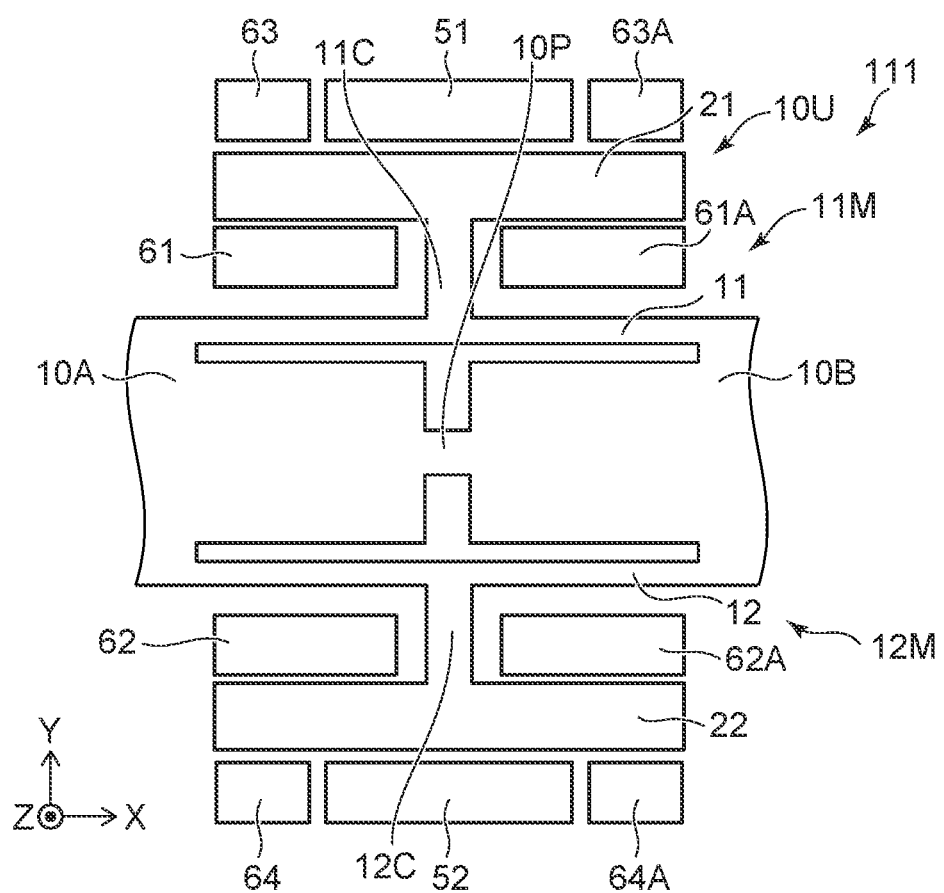
FIG. 8 is a schematic plan view illustrating a portion of a sensor according to the first embodiment.

FIG. 8 is a schematic plan view illustrating a portion of a sensor according to the first embodiment.

As shown in FIG. 8, in a sensor 111 according to the embodiment, the first detection element 10U includes a third drive conductive part 63 and a fourth drive conductive part 64 in addition to the first movable beam 11M, the second movable beam 12M, the first counter conductive part 51, the second counter conductive part 52, the first drive conductive part 61 (and the other first drive conductive part 61A) and the second drive conductive part 62 (and the other drive conductive part 62A). In this example, another third drive conductive part 63A and another fourth drive conductive part 64A are further provided.

The first drive conductive part 61 (and the other first drive conductive part 61A) faces the first movable beam 11M. The second drive conductive part 62 (and the other second drive conductive part 62A) faces the second movable beam 12M. The third drive conductive part 63 (and the other third drive conductive part 63A) faces the first movable beam 11M. The fourth drive conductive part 64 (and the other fourth drive conductive part 64A) faces the second movable beam 12M. In this example, there is a portion of the first movable beam 11M (first movable conductive part 21) between the first drive conductive part 61 and the third drive conductive part 63. In this example, there is a portion of the second movable beam 12M (second movable conductive part 22) between the second drive conductive part 62 and the fourth driven conductive part 64. In the sensor 111, the first drive conductive part 61 is between the first beam 11 and the first movable conductive part 21. The second drive conductive part 62 is between the second beam 12 and the second movable conductive part 22.

For example, the first operation includes applying the first voltage V1 including the AC component to the first drive conductive part 61 to vibrate the first movable beam 11M, applying the second voltage V2 including the AC component to the second derive conductive part 62 to vibrate the second movable beam 12M, and applying a voltage (a DC voltage, for example) to at least one of the third drive conductive part 63 or the fourth derive conductive part 64. For example, the movable beam vibrates due to the voltage applied to the first drive conductive part 61 and the second drive conductive part 62. The adjustment is performed by the voltage applied to the third drive conductive part 63 and the fourth drive conductive part 64. The first operation may include changing these voltages. The applied voltage may include at least one of the DC component or the AC component.

Figure 9:
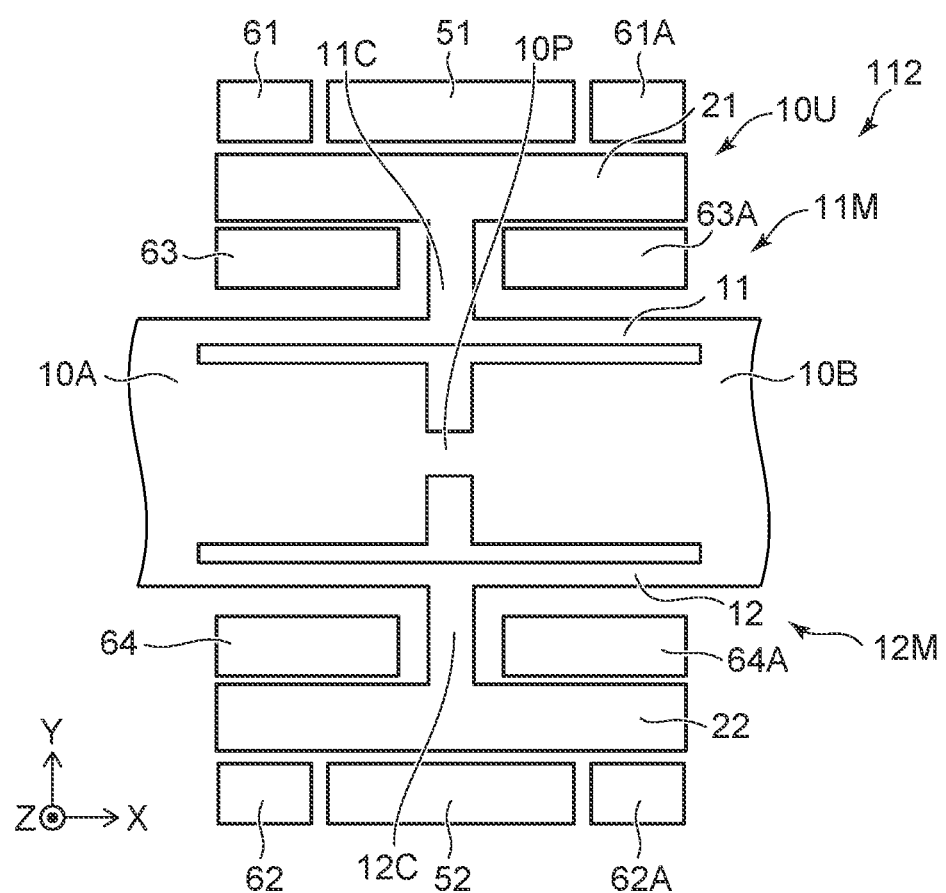
FIG. 9 is a schematic plan view illustrating a portion of a sensor according to the first embodiment.

FIG. 9 is a schematic plan view illustrating a portion of a sensor according to the first embodiment.

As shown in FIG. 9, in a sensor 112 according to the embodiment, the first detection element 10U includes the third drive conductive part 63 and the fourth drive conductive part 64 in addition to the first movable beam 11M, the second movable beam 12M, the first counter conductive part 51, the second counter conductive part 52, the first drive conductive part 61 (and the other first drive conductive part 61A) and the second drive conductive part 62 (and the other drive conductive part 62A). In the sensor 112, the third drive conductive part 63 is between the first beam 11 and the first movable conductive part 21. The third drive conductive part 64 is between the second beam 12 and the second movable conductive part 22. In the sensor 112, the operation described with respect to the sensor 111 may be performed.

Figure 10:
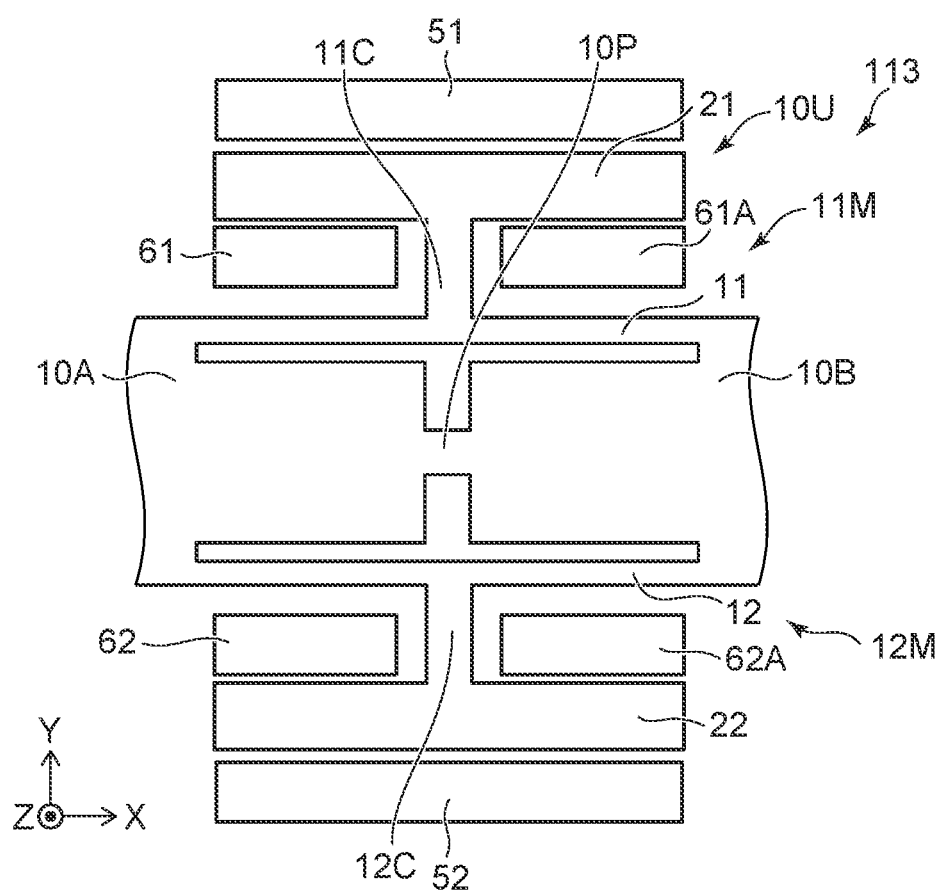
FIG. 10 is a schematic plan view illustrating a portion of a sensor according to the first embodiment.

FIG. 10 is a schematic plan view illustrating a portion of a sensor according to the first embodiment.

As shown in FIG. 10, in a sensor 113 according to the embodiment, the first detection element 10U includes the first movable beam 11M, the second movable beam 12M, the first counter conductive part 51, the second counter conductive part 52, the first drive conductive part 61 (and the other first drive conductive part 61A) and the second drive conductive part 62 (and the other drive conductive part 62A). In the sensor 113, the first drive conductive part 61 is between the first beam 11 and the first movable conductive part 21. The second drive conductive part 62 is between the second beam 12 and the second movable conductive part 22. In the sensor 113, the operation described with respect to the sensor 111 may be performed.

Figure 11:
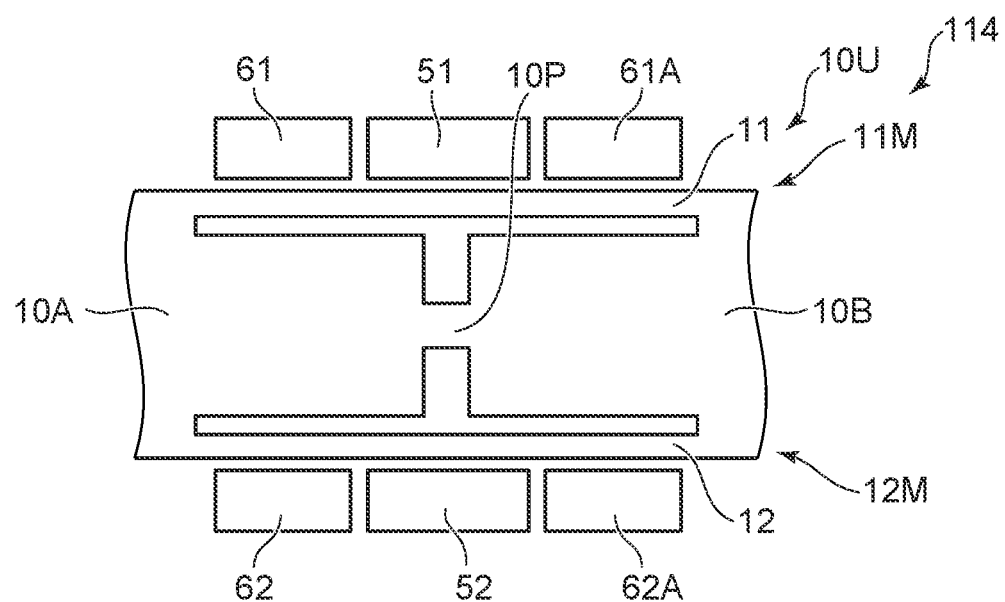
FIG. 11 is a schematic plan view illustrating a portion of a sensor according to the first embodiment.

FIG. 11 is a schematic plan view illustrating a portion of a sensor according to the first embodiment.

As shown in FIG. 11, in a sensor 114 according to the embodiment, the first movable conductive part 21 is omitted in the first movable beam 11M, and the second movable conductive part 22 is omitted in the second movable beam 12M. The first operation described above can also be performed for the sensor 114. For example, the acceleration G and the temperature T are calculated (for example, estimated) and can be output. The detection accuracy can be improved.

In the embodiment, the calculated (estimated) temperature T (temperature T included in the output information) corresponds to the temperatures of the first movable beam 11M and the second movable beam 12M.

In the embodiment, the temperature T is accurately detected. The acceleration G corrected for the temperature T may be output. For example, the processing part 70 performs the following first operation. The first operation includes outputting the information regarding the acceleration G corrected for the temperature T based on the data regarding the relationship between the first resonance frequency $f_1$ of the first movable beam 11M based on the first signal sig1 obtained from the first counter conductive part 51, the second resonance frequency $f_2$ of the movable beam 12M based on the second signal sig2 obtained from the second counter conductive part 52, the first resonance frequencies $f_1$ and the second resonance frequency $f_2$, the multiple accelerations G, and the multiple temperatures T.

Second Embodiment

Figure 12:
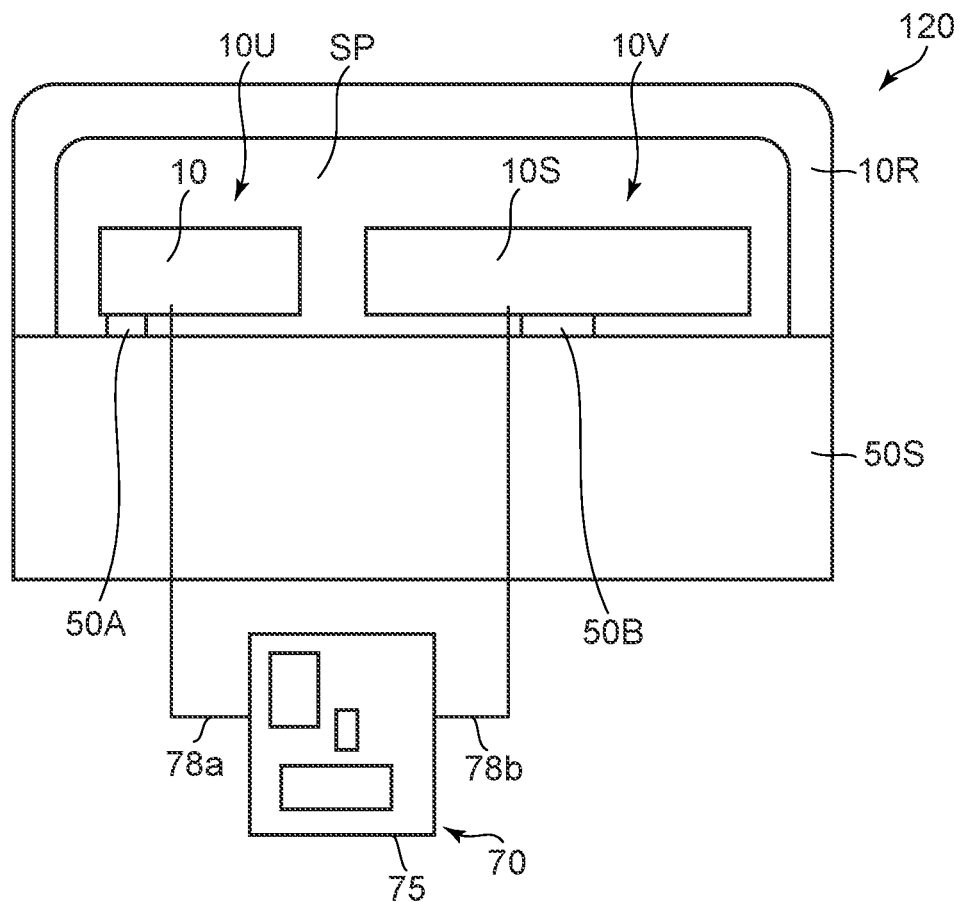
FIG. 12 is a schematic cross-sectional view illustrating a sensor according to a second embodiment.

FIG. 12 is a schematic cross-sectional view illustrating a sensor according to a second embodiment.

As shown in FIG. 12, a sensor 120 according to the embodiment includes a second detection element 10V in addition to the first detection element 10U described with respect to the first embodiment. The second detection element 10V includes, for example, a second supporter 50B and a second movable part 10S. The second supporter 50B is fixed to the base body 50S. The second movable part 10S is supported by the second supporter 50B and is separated from the base body 50S. The sensor 120 is configured to detect the angle of the sensor 120 based on a signal corresponding to the movement of the second movable part 10S. For example, at least a portion of the second movable part 10S is vibrated. The angle can be detected by detecting the vibration state that changes according to the change of the angle. For example, the angle is detected based on the principle of Foucault's pendulum. The second movable part 10S is, for example, a rate integrating gyroscope (RIG). The sensor 120 is, for example, an inertial measurement unit (IMU).

The configuration described in reference to the first embodiment is applicable to the configuration of the base body 50S, the first supporter 50A, the first movable part 10, etc., of the sensor 120.

As shown in FIG. 12, a lid part 10R may be provided in the sensor 120. The lid part 10R is connected with the base body 50S. The first supporter 50A, the first movable part 10, the second supporter 50B, and the second movable part 10S are between the base body 50S and the lid part 10R. For example, a space SP that is surrounded with the base body 50S and the lid part 10R is less than 1 atmosphere. By depressurizing the space SP, the detection can be performed with higher accuracy. The space SP is, for example, not more than 0.1 Pa.

As shown in FIG. 12, an electrical signal that is obtained from the first movable part 10 and an electrical signal that is obtained from the second movable part 10S may be supplied to a processing circuit 75. For example, the first movable part 10 and the processing circuit 75 are electrically connected by wiring 78a. The second movable part 10S and the processing circuit 75 are electrically connected by wiring 78b. The processing circuit 75 is, for example, a PLL circuit. For example, the processing circuit 75 is included in the processing part 70. The change of the resonance frequency obtained from the first movable part 10 can be detected by the processing circuit 75. For example, the acceleration and the temperature can be detected thereby. The change of the resonance frequency obtained from the second movable part 10S can be detected by the processing circuit 75. For example, the angle can be detected thereby. The angular velocity may be detected. A small sensor is obtained.

Third Embodiment

The third embodiment relates to an electronic device.

Figure 13:
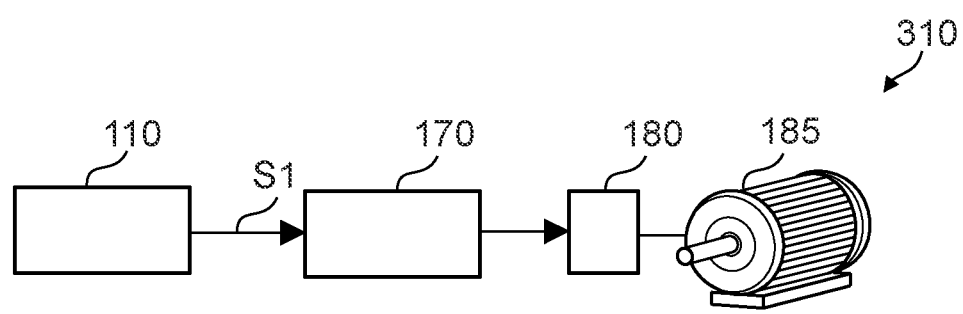
FIG. 13 is a schematic view illustrating an electronic device according to a third embodiment.

FIG. 13 is a schematic view illustrating the electronic device according to the third embodiment.

As shown in FIG. 13, an electronic device 310 according to the third embodiment includes the sensor according to the first embodiment or the second embodiment, and a circuit processing part 170. In the example of FIG. 13, the sensor 110 is drawn as the sensor. The circuit processing part 170 can control a circuit 180 based on the signal 51 obtained from the sensor. The circuit 180 is, for example, a control circuit of a drive device 185. According to the embodiment, the circuit 180 for controlling the drive device 185 and the like can be controlled with high accuracy based on the detection result with high accuracy.

FIGS. 14A to 14H are schematic views illustrating applications of the electronic device.

Figure 14A:
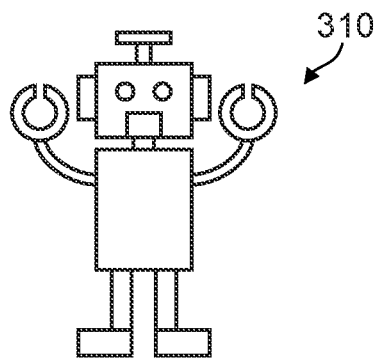
FIGS. 14A to 14H are schematic views illustrating applications of the electronic device.
Figure 14B:
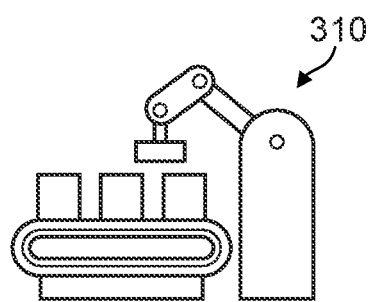
Figure 14C:
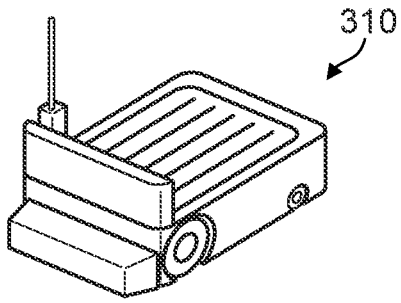
Figure 14D:
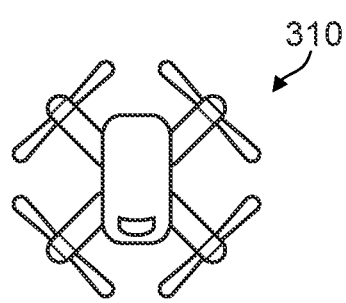
Figure 14E:
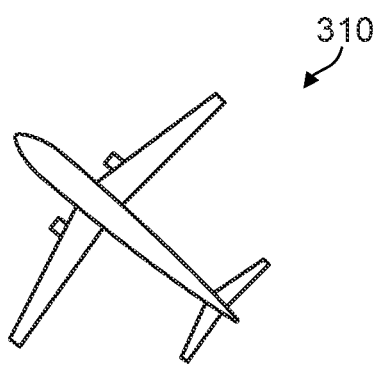
Figure 14F:
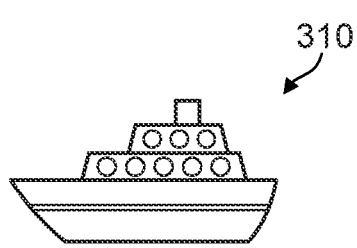
Figure 14G:
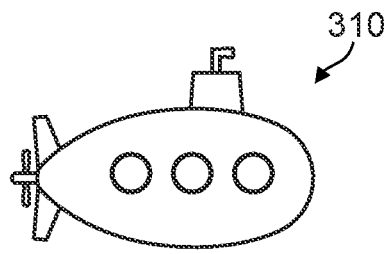
Figure 14H:
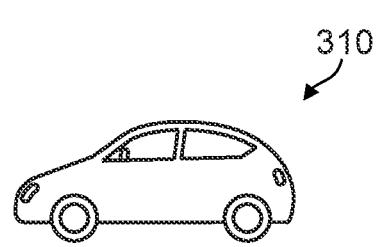

As shown in FIG. 14A, the electronic device 310 may be at least a portion of a robot. As shown in FIG. 14B, the electronic device 310 may be at least a portion of a machining robot provided in a manufacturing plant, etc. As shown in FIG. 14C, the electronic device 310 may be at least a portion of an automatic guided vehicle inside a plant, etc. As shown in FIG. 14D, the electronic device 310 may be at least a portion of a drone (an unmanned aircraft). As shown in FIG. 14E, the electronic device 310 may be at least a portion of an airplane. As shown in FIG. 14F, the electronic device 310 may be at least a portion of a ship. As shown in FIG. 14G, the electronic device 310 may be at least a portion of a submarine. As shown in FIG. 14H, the electronic device 310 may be at least a portion of an automobile. The electronic device 310 according to the third embodiment may include, for example, at least one of a robot or a moving body.

Embodiments include the following configurations (e.g., technological proposals).

Configuration 1

A sensor, comprising:
a first detection element; and
a processing part,
the first detection element including
a base body,
a first supporter fixed to the base body,
a first movable part supported by the first supporter and separated from the base body, the first movable part including
a first movable base part supported by the first supporter, a second movable base part connected with the first movable base part, a first movable beam including a first beam, and a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part, a first counter conductive part facing the first movable beam, and a second counter conductive part facing the second movable beam, the processing part being configured to perform a first operation, the first operation outputting information regarding an acceleration applied to the first detection element and a temperature of the first detection element based on a first signal obtained from the first counter conductive part and a second signal obtained from the second counter conductive part.

Configuration 2

The sensor according to Configuration 1, wherein the first operation includes deriving the information based on a difference and a sum of a first resonance frequency of the first movable beam and a second resonance frequency of the second movable beam, the first resonance frequency being obtained from the first signal, the second resonance frequency being obtained from the second signal.

Configuration 3

The sensor according to Configuration 2, wherein the first operation includes acquiring data from a storage part storing the data regarding a relationship between the acceleration and the temperature, and the first resonance frequency and the second resonance frequency, and includes deriving the information based on the data.

Configuration 4

The sensor according to Configuration 3, further comprising: the storage part.

Configuration 5

The sensor according to Configuration 3 or 4, wherein the acceleration is a first function of the first resonance frequency and the second resonance frequency, the temperature is a second function of the first resonance frequency and the second resonance frequency, and the data includes at least one of values of a coefficient included in the first function and a coefficient included in the second function.

Configuration 6

The sensor according to Configuration 3 or 4, wherein the acceleration and the temperature are represented by following a first equation and a second equation, $$G(f_1, f_2) = a_1 f_1 + b_1 f_2 + c_1 \quad (1)$$

$$T(f_1, f_2) = a_2 f_1 + b_2 f_2 + c_2 \quad (2)$$

the $G(f_1, f_2)$ is the acceleration, the $T(f_1, f_2)$ is the temperature, the $f_1$ is the first resonance frequency, the $f_2$ is the second resonance frequency, the $a_1$, the $b_1$, the $c_1$, the $a_2$, the $b_2$, and the $c_2$ are coefficients, the data includes at least one of values of the $a_1$, the $b_1$, the $c_1$, the $a_2$, the $b_2$, and the $c_2$.

Configuration 7

A sensor, comprising:

a first detection element; and a processing part, the first detection element including a base body, a first supporter fixed to the base body, a first movable part supported by the first supporter and separated from the base body, the first movable part including a first movable base part supported by the first supporter, a second movable base part connected with the first movable base part, a first movable beam including a first beam, and a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part, a first counter conductive part facing the first movable beam, and a second counter conductive part facing the second movable beam, the processing part being configured to perform a first operation, the first operation outputting information regarding an acceleration corrected for a temperature based on data regarding relationship between a first resonance frequency of the first movable beam based on a first signal obtained from the first counter conductive part, a second resonance frequency of the second movable beam based on a second signal obtained from the second counter conductive part, the first resonance frequency and the second resonance frequency, and a plurality of accelerations and a plurality of temperatures.

Configuration 8

The sensor according to any one of configurations 1 to 7, wherein the first movable part is conductive, the first signal corresponds to a first electrical signal generated between the first movable part and the first counter conductive part, and the second signal corresponds to a second electrical signal generated between the first movable part and the second counter conductive part.

Configuration 9

The sensor according to any one of Configurations 1 to 8, wherein a first direction from the base body toward the first movable part crosses a second direction from the first end portion toward the first other end portion, and a direction from the second end portion toward the second other end portion is along the second direction.

Configuration 10

The sensor according to configuration 9, wherein the first movable part further includes a connection base part, the connection base part is provided between the first movable base part and the second movable base part, and connects the first movable base part and the second movable base part each other, a third length along the third direction of the connection base part is shorter than a first length along the third direction of the first movable base part, shorter than a second length along the third direction of the second movable base part, and the third direction crosses a plane including the first direction and the second direction, and the connection base part is between the first beam and the second beam in the third direction.

Configuration 11

The sensor according to Configuration 10, wherein
the first movable part further includes a movable member,
the second movable base part is between the connection base part and the movable member in the second direction,
the movable member is connected with the second movable base part, and
a length along the third direction of the movable member is longer than the second length.

Configuration 12

The sensor according to any one of Configurations 9 to 11, wherein
the first movable beam further includes
a first movable conductive part, and
a first connection region,
the first beam includes a first intermediate region between the first end portion and the first other end portion,
the first connection region connects the first intermediate region and the first movable conductive part, and
a length along the second direction of the first movable conductive part is longer than a length along the second direction of the first connection region.

Configuration 13

The sensor according to Configuration 12, wherein
the second movable beam further includes
a second movable conductive part, and
a second connection region,
the second beam includes a second intermediate region between the second end portion and the second other end portion,
the second connection region connects the second intermediate region and the second movable conductive part, and
a length along the second direction of the second movable conductive part is longer than a length along the second direction of the second connection region, Configuration 14

The sensor according to any one of Configurations 2 to 7, wherein
the first detection element includes a first drive conductive part and a second drive conductive part,
the first drive conductive part faces the first movable beam,
the second drive conductive part faces the second movable beam,
the first resonance frequency changes by a first voltage of the first drive conductive part,
the second resonance frequency changes by a second voltage of the second drive conductive part, and
the first operation includes changing at least one of the first voltage or the second voltage and reducing temperature dependence of the difference between the first resonance frequency and the second resonance frequency.

Configuration 15

The sensor according to any one of Configurations 2 to 7, wherein
the first detection element includes a first drive conductive part and a second drive conductive part,
the first drive conductive part faces the first movable beam,
the second drive conductive part faces the second movable beam,
the first operation includes applying a first voltage including an AC component to the first drive conductive part to vibrate the first movable beam, and applying a second voltage including an AC component to the second drive conductive part to vibrate the second movable beam.

Configuration 16

The sensor according to Configuration 15, wherein
a DC component of the first voltage is different from a DC component of the second voltage.

Configuration 17

The sensor according to any one of Configurations 1 to 16, wherein
the first detection element includes first to fourth drive conductive parts,
the first drive conductive part faces the first movable beam,
the second drive conductive part faces the second movable beam,
the third drive conductive part faces the first movable beam,
the fourth drive conductive part faces the second movable beam,
the first operation includes applying a first voltage including an AC component to the first drive conductive part to vibrate the first movable beam, applying a second voltage including an AC component to the second drive conductive part to vibrate the second movable beam, and applying a DC voltage to at least one of the third drive conductive part or the fourth drive conductive part.

Configuration 18

The sensor according to Configuration 13, wherein
the first operation includes changing the DC voltage.

Configuration 19

The sensor according to any one of Configurations 1 to 18, further comprising:
a second detection element including
a second supporter fixed to the base body; and
a second movable part supported by the second supporter and separated from the base body,
an angle being configured to be detected by a signal corresponding to movement of the second movable part, Configuration 20

An electronic device, comprising:
the sensor according to any one of Configurations 1 to 19; and
a circuit processing part configured to control a circuit based on a signal obtained from the sensor.

According to embodiments, a sensor and an electronic device can be provided in which the detection accuracy can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, supporters, movable parts, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, and electronic devices practicable by an appropriate design modification by one skilled in the art based on the sensors, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a first detection element; and
   a processing part,
   the first detection element including
      a base body,
      a first supporter fixed to the base body,
      a first movable part supported by the first supporter and separated from the base body, the first movable part including
         a first movable base part supported by the first supporter,
         a second movable base part connected with the first movable base part,
         a first movable beam including a first beam, and
         a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part,
      a first counter conductive part facing the first movable beam, and
      a second counter conductive part facing the second movable beam,
   the processing part being configured to perform a first operation, the first operation comprising outputting information regarding an acceleration applied to the first detection element and a temperature of the first detection element based on a first signal obtained from the first counter conductive part and a second signal obtained from the second counter conductive part,
   wherein
      a first direction from the base body toward the first movable part crosses a second direction from the first end portion toward the first other end portion,
      a direction from the second end portion toward the second other end portion is along the second direction,
      the first movable beam further includes
         a first movable conductive part, and
         a first connection region,
      the first beam includes a first intermediate region between the first end portion and the first other end portion,
      the first connection region connects the first intermediate region and the first movable conductive part, and
      a length along the second direction of the first movable conductive part is longer than a length along the second direction of the first connection region.

2. The sensor according to claim 1, wherein
   the first operation includes deriving the information based on a difference and a sum of a first resonance frequency of the first movable beam and a second resonance frequency of the second movable beam, the first resonance frequency being obtained from the first signal, the second resonance frequency being obtained from the second signal.

3. The sensor according to claim 2, wherein
   the first operation includes acquiring data from a storage part storing the data regarding a relationship between the acceleration and the temperature, and the first resonance frequency and the second resonance frequency, and includes deriving the information based on the data.

4. The sensor according to claim 3, further comprising: the storage part.

5. The sensor according to claim 3, wherein
   the acceleration is a first function of the first resonance frequency and the second resonance frequency,
   the temperature is a second function of the first resonance frequency and the second resonance frequency, and
   the data includes at least one of values of a coefficient included in the first function and a coefficient included in the second function.

6. The sensor according to claim 3, wherein
   the acceleration and the temperature are represented by following a first equation and a second equation, $$G(f1, f2) = a1f1 + b1f2 + c1 \quad (1)$$

$$T(f1, f2) = a2f1 + b2f2 + c2 \quad (2)$$

the G (f1, f2) is the acceleration, the T (f1, f2) is the temperature, the f1 is the first resonance frequency, the f2 is the second resonance frequency, the a1, the b1, the c1, the a2, the b2, and the c2 are coefficients,
   the data includes at least one of values of the a1, the b1, the c1, the a2, the b2, and the c2.

7. The sensor according to claim 1, wherein
   the first movable part is conductive,
   the first signal corresponds to a first electrical signal generated between the first movable part and the first counter conductive part, and
   the second signal corresponds to a second electrical signal generated between the first movable part and the second counter conductive part.

8. The sensor according to claim 1, wherein
   the first movable part further includes a connection base part,
   the connection base part is provided between the first movable base part and the second movable base part, and connects the first movable base part and the second movable base part each other,
   a third length along a third direction of the connection base part is shorter than a first length along the third direction of the first movable base part, shorter than a second length along the third direction of the second movable base part, and the third direction crosses a plane including the first direction and the second direction, and the connection base part is between the first beam and the second beam in the third direction.

9. The sensor according to claim 8, wherein
the first movable part further includes a movable member,
the second movable base part is between the connection base part and the movable member in the second direction,
the movable member is connected with the second movable base part, and
a length along the third direction of the movable member is longer than the second length.

10. The sensor according to claim 1, wherein
the second movable beam further includes
a second movable conductive part, and
a second connection region,
the second beam includes a second intermediate region between the second end portion and the second other end portion,
the second connection region connects the second intermediate region and the second movable conductive part, and
a length along the second direction of the second movable conductive part is longer than a length along the second direction of the second connection region.

11. The sensor according to claim 2, wherein
the first detection element includes a first drive conductive part and a second drive conductive part,
the first drive conductive part faces the first movable beam,
the second drive conductive part faces the second movable beam,
the first resonance frequency changes by a first voltage of the first drive conductive part,
the second resonance frequency changes by a second voltage of the second drive conductive part, and
the first operation includes changing at least one of the first voltage or the second voltage and reducing temperature dependence of the difference between the first resonance frequency and the second resonance frequency.

12. The sensor according to claim 2, wherein
the first detection element includes a first drive conductive part and a second drive conductive part,
the first drive conductive part faces the first movable beam,
the second drive conductive part faces the second movable beam, and
the first operation includes applying a first voltage including an AC component to the first drive conductive part to vibrate the first movable beam, and applying a second voltage including an AC component to the second drive conductive part to vibrate the second movable beam.

13. The sensor according to claim 12, wherein
a DC component of the first voltage is different from a DC component of the second voltage.

14. The sensor according to claim 1, wherein
the first detection element includes first to fourth drive conductive parts,
the first drive conductive part faces the first movable beam,
the second drive conductive part faces the second movable beam,
the third drive conductive part faces the first movable beam,
the fourth drive conductive part faces the second movable beam, and
the first operation includes applying a first voltage including an AC component to the first drive conductive part to vibrate the first movable beam, applying a second voltage including an AC component to the second drive conductive part to vibrate the second movable beam, and applying a DC voltage to at least one of the third drive conductive part or the fourth drive conductive part.

15. The sensor according to claim 14, wherein
the first operation includes changing the DC voltage.

16. The sensor according to claim 1, further comprising:
a second detection element including
a second supporter fixed to the base body; and
a second movable part supported by the second supporter and separated from the base body,
an angle being configured to be detected by a signal corresponding to movement of the second movable part.

17. An electronic device, comprising:
the sensor according to claim 1; and
a circuit processing part configured to control a circuit based on a signal obtained from the sensor.

18. A sensor, comprising:
a first detection element; and
a processing part,
the first detection element including
a base body,
a first supporter fixed to the base body,
a first movable part supported by the first supporter and separated from the base body, the first movable part including
a first movable base part supported by the first supporter,
a second movable base part connected with the first movable base part,
a first movable beam including a first beam, and
a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part,
a first counter conductive part facing the first movable beam, and
a second counter conductive part facing the second movable beam,
the processing part being configured to perform a first operation, the first operation comprising outputting information regarding an acceleration applied to the first detection element and a temperature of the first detection element based on a first signal obtained from the first counter conductive part and a second signal obtained from the second counter conductive part,
wherein
the first operation includes deriving the information based on a difference and a sum of a first resonance frequency of the first movable beam and a second resonance frequency of the second movable beam, the first resonance frequency being obtained from the first signal, the second resonance frequency being obtained from the second signal, the first detection element includes a first drive conductive part and a second drive conductive part, the first drive conductive part faces the first movable beam, the second drive conductive part faces the second movable beam, the first operation includes applying a first voltage including an AC component to the first drive conductive part to vibrate the first movable beam, and applying a second voltage including an AC component to the second drive conductive part to vibrate the second movable beam, and a DC component of the first voltage is different from a DC component of the second voltage.

19. A sensor, comprising:

a first detection element; and a processing part, the first detection element including
  a base body,
  a first supporter fixed to the base body,
  a first movable part supported by the first supporter and separated from the base body, the first movable part including
    a first movable base part supported by the first supporter,
    a second movable base part connected with the first movable base part,
    a first movable beam including a first beam, and
    a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part,
  a first counter conductive part facing the first movable beam, and
  a second counter conductive part facing the second movable beam, the processing part being configured to perform a first operation, the first operation comprising outputting information regarding an acceleration applied to the first detection element and a temperature of the first detection element based on a first signal obtained from the first counter conductive part and a second signal obtained from the second counter conductive part, wherein
  the first detection element includes first to fourth drive conductive parts,
  the first drive conductive part faces the first movable beam,
  the second drive conductive part faces the second movable beam,
  the third drive conductive part faces the first movable beam,
  the fourth drive conductive part faces the second movable beam, and
  the first operation includes applying a first voltage including an AC component to the first drive conductive part to vibrate the first movable beam, applying a second voltage including an AC component to the second drive conductive part to vibrate the second movable beam, and applying a DC voltage to at least one of the third drive conductive part or the fourth drive conductive part.

20. A sensor, comprising:

a first detection element; and a processing part, the first detection element including
  a base body,
  a first supporter fixed to the base body,
  a first movable part supported by the first supporter and separated from the base body, the first movable part including
    a first movable base part supported by the first supporter,
    a second movable base part connected with the first movable base part,
    a first movable beam including a first beam, and
    a second movable beam including a second beam, the first beam including a first end portion and a first other end portion, the first end portion being connected with the first movable base part, the first other end portion being connected with the second movable base part, the second beam including a second end portion and a second other end portion, the second end portion being connected with the first movable base part, the second other end portion being connected with the second movable base part,
  a first counter conductive part facing the first movable beam, and
  a second counter conductive part facing the second movable beam, the processing part being configured to perform a first operation, the first operation comprising outputting information regarding an acceleration applied to the first detection element and a temperature of the first detection element based on a first signal obtained from the first counter conductive part and a second signal obtained from the second counter conductive part, wherein
  the first operation includes deriving the information based on a difference and a sum of a first resonance frequency of the first movable beam and a second resonance frequency of the second movable beam, the first resonance frequency being obtained from the first signal, the second resonance frequency being obtained from the second signal,
  the first operation includes acquiring data from a storage part storing the data regarding a relationship between the acceleration and the temperature, and the first resonance frequency and the second resonance frequency, and includes deriving the information based on the data,
  the acceleration and the temperature are represented by following a first equation and a second equation, $$G(f_1, f_2) = a_1 f_1 + b_1 f_2 + c_1 \tag{1}$$

$$T(f_1, f_2) = a_2 f_1 + b_2 f_2 + c_2 \tag{2}$$

the G ($f_1$, $f_2$) is the acceleration, the T ($f_1$, $f_2$) is the temperature, the $f_1$ is the first resonance frequency, the $f_2$ is the second resonance frequency, the $a_1$, the $b_1$, the $c_1$, the $a_2$, the $b_2$, and the $c_2$ are coefficients, and the data includes at least one of values of the $a_1$, the $b_1$, the $c_1$, the $a_2$, the $b_2$, and the $c_2$.

* * * * *